US012741532B2

(12) United States Patent
Mann et al.

(10) Patent No.: US 12,741,532 B2
(45) Date of Patent: Sep. 22, 2026

(54) DRIVE ASSEMBLY, AXLE AND WORK MACHINE

(71) Applicant: DEERE & COMPANY, Moline, IL (US)

(72) Inventors: Manuel Mann, Hüffenhardt (DE); Matthias Lang, Mannheim (DE); Stefan Raisch, Vaihingen (DE); Frank Buhrke, Birkenau (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 19/228,828

(22) Filed: Jun. 5, 2025

(65) Prior Publication Data

US 2026/0014853 A1 Jan. 15, 2026

(30) Foreign Application Priority Data

Jul. 12, 2024 (EP) .................................... 24188166

(51) Int. Cl.

| | |
|---|---|
| ***B60K 17/28*** | (2006.01) |
| ***B60K 1/00*** | (2006.01) |
| ***B60K 17/12*** | (2006.01) |
| ***B60K 17/16*** | (2006.01) |
| *B60L 50/60* | (2019.01) |

(52) U.S. Cl.

CPC ................ *B60K 17/28* (2013.01); *B60K 1/00* (2013.01); *B60K 17/12* (2013.01); *B60K 17/165* (2013.01); *B60L 50/60* (2019.02); *B60L 2200/40* (2013.01)

(58) Field of Classification Search

CPC ........ B60K 17/12; B60K 17/165; B60L 50/60
See application file for complete search history.

(56) References Cited

U.S. PATENT DOCUMENTS

| | | | |
|---|---|---|---|
| 11,833,903 | B2 | 12/2023 | Chae et al. |
| 2023/0227106 | A1 | 7/2023 | Takaki et al. |

FOREIGN PATENT DOCUMENTS

| | | | |
|---|---|---|---|
| CN | 102975609 | A | 3/2013 |
| CN | 106183765 | A | 12/2016 |
| CN | 106828064 | A | 6/2017 |
| DE | 102008032848 | A1 | 1/2010 |
| DE | 102017205149 | A1 | 9/2018 |
| DE | 102019106294 | A1 | 9/2020 |
| DE | 102020114063 | A1 | 12/2021 |
| DE | 102020119984 | A1 | 2/2022 |
| EP | 1466773 | A2 | 10/2004 |

OTHER PUBLICATIONS

Extended European Search Report and Written Opinion issued in European Patent Application No. 24188166.3 dated Dec. 2, 2024, in 18 pages.

M. Lang, Design and Analysis of a Magnetic-Electric Epicyclic Power-Split Transmission Stage for Use in an Agricultural Vehicle, Dissertation, Berlin 2020, pp. 1-309.

*Primary Examiner* — Derek D Knight

(57) ABSTRACT

A drive assembly for a work machine includes an energy machine, a rotational speed compensating device, a first power output, and a magnetic-electric epicyclic gear set connected to the energy machine via a drive shaft, the magnetic-electric epicyclic gear set being arranged to adjust the rotational speed of one or more of the first power output or the rotational speed compensating device.

17 Claims, 5 Drawing Sheets

DRIVE ASSEMBLY, AXLE AND WORK MACHINE

CROSS-REFERENCE TO RELATED APPLICATIONS

This application claims priority to European Patent Application No. 24188166.3, filed Jul. 12, 2024, which is hereby incorporated by reference.

FIELD OF THE DISCLOSURE

The disclosure relates to a drive assembly for a work machine.

BACKGROUND

Work machines, for example construction machines or agricultural work vehicles, such as agricultural towing vehicles or farm tractors, are usually driven by internal combustion engines. In this context, the internal combustion engine can drive one or more axles of the work machine, in particular a rear axle and/or a front axle. The one or more axles are usually driven by the crankshaft of the internal combustion engine via a transmission with a variable transmission ratio and one or more travel drives, in particular one or more differentials. The travel drive, in particular the differential, can be in drive connection on the driven side with the shafts of the wheels, in particular the front and/or rear wheels.

The internal combustion engine can likewise additionally drive a first power output, in particular a mechanical power output. More specifically, the internal combustion engine can drive a PTO unit, in particular a power takeoff shaft. The PTO unit can be situated on a rear side of the work machine, in particular in the vicinity of an attachment interface for implements.

SUMMARY

According to an aspect of the present disclosure, a drive assembly for a work machine includes an energy machine, a rotational speed compensating device, a first power output, and a magnetic-electric epicyclic gear set connected to the energy machine via a drive shaft, the magnetic-electric epicyclic gear set being arranged to adjust the rotational speed of one or more of the first power output or the rotational speed compensating device.

According to an aspect of the present disclosure, the epicyclic gear set is inserted into the power flow between the energy machine and the first power output.

According to an aspect of the present disclosure, the epicyclic gear set is inserted into the power flow between the energy machine and the rotational speed compensating device.

According to an aspect of the present disclosure, the rotational speed compensating device is connected on the driven side to a first and second final driven shaft for driving ground-engaging means.

According to an aspect of the present disclosure, the drive shaft is designed as a hollow shaft.

According to an aspect of the present disclosure, the energy machine has an axis of rotation aligned coaxially with and parallel to the drive shaft.

According to an aspect of the present disclosure, one of the energy machine or the epicyclic gear set is connected via an angular gear set to the first power output.

According to an aspect of the present disclosure, an axis of rotation the energy machine and an axis of rotation of the epicyclic gear set are arranged coaxially with and parallel to one another.

According to an aspect of the present disclosure, the epicyclic gear set has an internal rotor, an external rotor, and an interposed magnetic modulation ring.

According to an aspect of the present disclosure, the internal rotor of the epicyclic gear set is designed as a drive side and the modulation ring is designed as a driven side.

According to an aspect of the present disclosure, the energy machine is connected to the internal rotor of the epicyclic gear set via the drive shaft.

According to an aspect of the present disclosure, the first power output is connected on the drive side to the modulation ring.

According to an aspect of the present disclosure, the rotational speed compensating device is connected on the drive side to the modulation ring.

According to an aspect of the present disclosure, the external rotor is driven electrically via a control unit such that the first power output and the drive shaft rotate at a specifiable rotational speed.

According to an aspect of the present disclosure, an axle for a work vehicle includes the drive assembly disclosed herein.

According to an aspect of the present disclosure, a work vehicle includes the drive assembly disclosed herein.

The above and other features will become apparent from the following detailed description and accompanying drawings.

BRIEF DESCRIPTION OF THE DRAWINGS

The disclosure and other advantages and advantageous developments and modifications of the disclosure will be explained in greater detail below both in terms of hardware and in terms of method, using example embodiments and with reference to the drawings. Component parts of equivalent or comparable function are identified by the same reference signs in this case. In the drawings.

DETAILED DESCRIPTION

Figure 1:
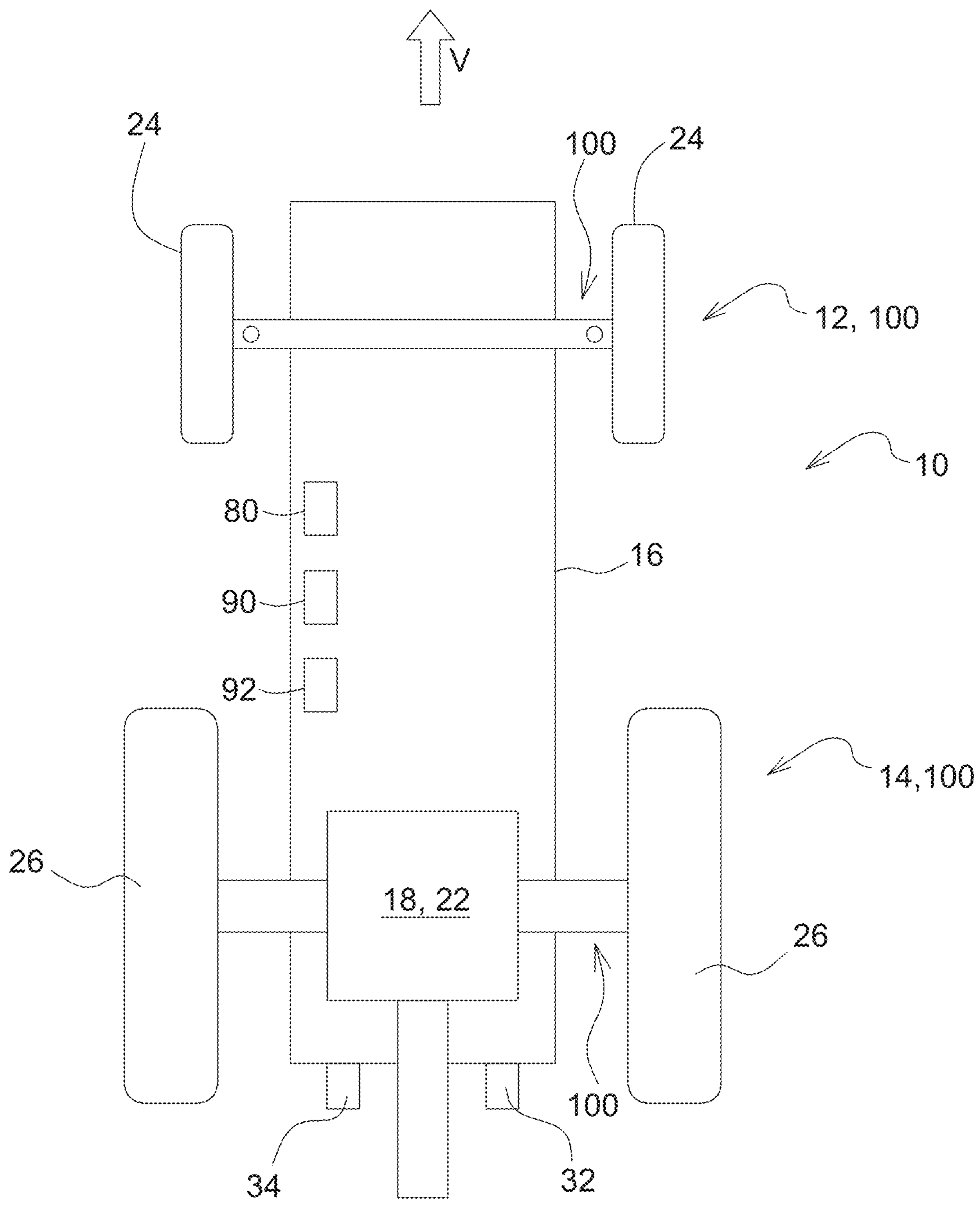
FIG. 1 shows a schematic illustration of a first example embodiment of a work machine according to the disclosure, in particular an agricultural towing vehicle in the form of a farm tractor.

The embodiments or implementations disclosed in the above drawings and the following detailed description are not intended to be exhaustive or to limit the present disclosure to these embodiments or implementations.

There are currently proposals for driving work machines of this kind by means of electric motors, in particular as purely battery-operated vehicles. One approach would transfer the existing drivetrain (constructed using a shaft running in the longitudinal direction but now driven by electric motor, and a differential) to such vehicles, as shown in US 2023/0227106 A1. DE 10 2008 032 848 A1 shows an axle for a work vehicle, in particular a floor conveyor, having a differential which is in drive connection on the driven side with the shafts of the rear wheels. The differential is driven by an electric motor via a hollow shaft, which coaxially surrounds one of the shafts of the rear wheels. For its part, the hollow shaft is driven via an electric motor designed as an internal-rotor motor, which is fitted around the hollow shaft. DE 10 2020 114 063 A1 shows a similar arrangement for a final drive of a motor vehicle but with a gear mechanism between the electric motor and the hollow shaft and a shift transmission between the hollow shaft and the differential.

In some approaches, the power takeoff shaft is driven by the internal combustion engine, wherein a superposition gear mechanism coupled to an additional electric motor can be used for setting the rotational speed (DE 10 2017 205 149 A1, EP 1 466 773 A2). In the case of purely electric drives, it has been proposed to drive the power takeoff shaft by means of a first electric motor, which is connected by a superposition gear mechanism to the travel drive, while the superposition gear mechanism is also driven by a further electric motor (DE 10 2019 106 294 A1).

Proceeding from these approaches, it is an object of the present disclosure to propose a drive assembly, an axle and a work machine that are improved in comparison with these approaches. More specifically, it is an object of the present disclosure to propose a drive assembly, an axle and a work machine which are of structurally simpler and/or more compact configuration.

This object is achieved by a drive assembly for a work machine as disclosed herein. Some of the embodiments may relate to particularly advantageous embodiments of the disclosure.

According to the disclosure, a drive assembly for a work machine is proposed. More specifically, the proposal is, in particular, for a drive assembly for an axle of a work machine, for example an electrically driven axle of a work machine. The drive assembly comprises an energy machine and a rotational speed compensating device and a first power output and a magnetic-electric epicyclic gear set, in particular a magnetic-electric epicyclic gear set with an integrated electric machine. The epicyclic gear set is connected to the energy machine via a or by means of a or by a drive shaft. The epicyclic gear set is arranged for the purpose of setting and/or adjusting the rotational speed and/or the torque of the first power output and/or of the rotational speed compensating device, in particular of a drive side of the rotational speed compensating device. In other words, as an alternative or in addition, the epicyclic gear set can be used to set and/or adjust the rotational speed of the first power output and/or of the rotational speed compensating device. The energy machine and the epicyclic gear set can be installed transversely into the axle of the work machine. Moreover, the energy machine and the epicyclic gear set can be operated independently of one another.

The energy machine can be designed as an electric motor. Alternatively, the energy machine can be designed as a fuel cell. However, the energy machine can also be a permanent-magnet and/or electrically excited synchronous and/or asynchronous machine that is operated using direct current and/or three-phase current, for example a permanent-magnet three-phase synchronous machine. The energy machine can be operable as a motor or a generator. The energy machine can drive the drive assembly with a force and/or a rotational speed and/or a torque. The energy machine can comprise a driven output and/or a driven shaft. The energy machine can be connected on the driven side to the drive shaft. For this purpose, a rotor of the energy machine, in particular an internal rotor, can be connected to the drive shaft, for example. The energy machine can be embodied as a torque motor. In this embodiment, the energy machine drives the drive shaft directly. However, it is also equally possible for the energy machine to be connected to the drive shaft directly or via a or by means of a or by a first transmission stage, in particular a first spur gear stage or a first gearwheel pair or a first planetary set, or a first transmission. The energy machine can thus be connected to the drive shaft with a fixed transmission ratio or with a variable transmission ratio, e.g. via the first transmission. The energy machine can also be designed as a generator and can charge an energy store, in particular in a regeneration mode. The energy machine can be connected directly or indirectly to the rotational speed compensating device and/or the first power output. More specifically, the energy machine can drive the drive shaft and/or the rotational speed compensating device and/or the first power output. The drive assembly can comprise a set of power electronics in order to transmit the electric power between the energy machine, the energy store and the epicyclic gear set, in particular the external rotor or external stator.

The drive assembly, in particular the axle or the work machine, can comprise the energy store or stores. The energy store or stores can be electrically connected and/or capable of being electrically coupled to the energy machine and/or the epicyclic gear set, in particular an external stator of the epicyclic gear set. The energy store can be an electric energy store. The energy store can supply the connected energy machine(s) with energy, in particular electrical energy. The energy store can be connected and/or couplable, in particular electrically connected and/or electrically couplable, to the energy machine. The energy store can be designed as a battery and/or a rechargeable battery and/or a supercapacitor and/or a fuel cell and/or some other device for storing electrical energy.

Connected can for example be understood as meaning mechanically connected, such as drivably connected, i.e. connected in a torque- and/or speed-transmitting manner, and/or coupled or couplable, i.e. mechanically coupled and/or rigidly coupled or mechanically couplable. Mechanically connected, for example drivably connected and/or coupled or couplable, or mechanically coupled or mechanically couplable, can therefore be understood as meaning in particular a connection of two components which makes it possible to transmit an energy and/or a force and/or a torque and/or a rotational speed from one component to the other, in particular mechanically. Further components or parts enabling such a transmission of energy and/or force and/or torque and/or transmission of a rotational speed between the two components can be provided between the two components.

The rotational speed compensating device can be drivable on the drive side. The rotational speed compensating device can be drivable at and/or with the drive side. The rotational speed compensating device can be connected on the driven side to ground-engaging means. On the driven side, the rotational speed compensating device can be designed to drive ground-engaging means. The rotational speed compensating device can be designed to drive ground-engaging means on the and/or with the driven side. The rotational speed compensating device can comprise one input and two outputs. The two outputs can be in a kinematic equilibrium. The input can be the drive side. The two outputs can be the driven side, in particular a first and second driven side. In other words, the rotational speed compensating device can comprise at least one final driven output, for example two final driven outputs, on the driven side for driving ground-engaging means. The rotational speed compensating device can comprise at least one final driven shaft, for example two final driven shafts, such as a first and a second final driven shaft, for driving ground-engaging means. On the driven side, the rotational speed compensating device can be connected to the at least one final driven shaft, for example the two final driven shafts, such as the first and second final driven shaft. The rotational speed compensating device can be a differential. More specifically, the rotational speed compensating device can be designed as a bevel gear differential or planetary differential, that is to say, in particular, a planetary gear set, for example with double planets, or a bevel gear set. The rotational speed compensating device can be a spur gear differential with a cage.

The first power output can comprise a first output shaft and/or can be designed as a first output shaft. The first power output can likewise additionally comprise a PTO unit. The PTO unit can comprise a PTO gear and/or a power takeoff shaft. The PTO unit, in particular the PTO gear, can be connected on the drive side to the first output shaft. In addition, the PTO unit, in particular the PTO gear, can be connectable or connected on the driven side to the power takeoff shaft. The first power output can extend in a longitudinal and forward direction V of the drive assembly and/or axle and/or work machine. Alternatively, the drive assembly can additionally comprise a module for reversing the direction of rotation. The module for reversing the direction of rotation can be arranged downstream of the epicyclic gear set in the power flow.

The drive assembly or the work machine or the axle can comprise a control unit. The control unit can be connected to the energy machine for signaling, and/or can be operatively coupled and/or connected thereto for transmitting signals and/or carrying data. The control unit can be configured to receive one or more rotational speed signals and/or torque signals from the drive assembly, in particular from rotational speed and/or torque sensors of the drive assembly, and/or from the energy machine. The control unit can be configured to ascertain a rotational speed and/or a torque by means of the rotational speed signal and/or the torque signal. The control unit can be configured to set and/or adjust the rotational speed and/or the torque of the drive assembly, in particular of the energy machine, in particular to set and/or adjust a specifiable rotational speed and/or a specifiable torque. The control unit can be configured to set and/or adjust the rotational speed of the first power output and/or of the rotational speed compensating device with the epicyclic gear set.

More specifically, the drive assembly for the electrically driven axle and the first power output of an agricultural work vehicle can comprise a differential, which is coupled on the driven side to the first and second final driven shaft for driving the ground-engaging means and on the drive side to a hollow shaft which at least partially surrounds the final driven shaft, and the energy machine with an axis of rotation aligned coaxially or parallel to the hollow shaft. In addition, a first power output, which extends in the longitudinal and forward direction and serves as an auxiliary output, and a magnetic-electric epicyclic gear set are provided, wherein the energy machine is connected in a torque-transmitting manner to the hollow shaft and, via the angular gear set, to the first power output, and the epicyclic gear set is arranged for adjustment of the rotational speed of the first power output or of the hollow shaft.

A point for the disclosure is that the epicyclic gear set is arranged for setting and/or adjusting the rotational speed at the drive shaft and/or the rotational speed compensating device and/or the first power output, and/or that it is possible with the epicyclic gear set to set and/or adjust a rotational speed at the drive shaft and/or the rotational speed compensating device and/or the first power output. This enables the drive shaft and/or the rotational speed compensating device and/or the first power output to be driven with a variable transmission ratio by the energy machine without the interposition of a transmission. In other words, the epicyclic gear set sets a rotational speed at the drive shaft and/or the rotational speed compensating device and/or the first power output, and/or adjusts the rotational speed. In addition, it is possible to dispense with a structurally complex redirection of the torque such as that when a drive assembly is installed longitudinally since the drive assembly can be arranged transversely to the longitudinal axis of the work machine or along an axle. It is thereby possible to achieve a construction of the drive assembly that is simple in design and compact.

As a modification of the disclosure, the epicyclic gear set is inserted into the power flow between the energy machine and the first power output. Here, the power flow can be from the energy machine to the first power output. In other words, the epicyclic gear set can be arranged in the power flow between the energy machine and the first power output. The energy machine can be connected on the driven side, in particular directly, to the rotational speed compensating device and the epicyclic gear set. The energy machine can be connected to the rotational speed compensating device and the epicyclic gear set via the or by means of the or by the drive shaft. More specifically, the drive shaft can be connected to the rotational speed compensating device via a or by means of a or by a second transmission stage, in particular a second spur gear stage or a second gearwheel pair or a second planetary set, or a second transmission. Alternatively, or in addition, the drive shaft can be connected to the epicyclic gear set via a or by means of a or by a third transmission stage, in particular a third spur gear stage or a third gearwheel pair or a third planetary set, or a third transmission. On the driven side, the epicyclic gear set can be connected, in particular directly, to the first power output, in particular the first output shaft. The epicyclic gear set can be connected to the first power output, in particular the first output shaft, via a or by means of a or by a fourth transmission stage, in particular a fourth spur gear stage or a fourth gearwheel pair or a fourth planetary set, or a fourth transmission.

As a modification of the disclosure, the epicyclic gear set is inserted into the power flow between the energy machine and the rotational speed compensating device. Here, the power flow can be from the energy machine to the rotational speed compensating device. In other words, the epicyclic gear set can be arranged in the power flow between the energy machine and the rotational speed compensating device. The energy machine can be connected on the driven side, in particular directly, to the first power output and the epicyclic gear set. The energy machine can be connected to the first power output and the epicyclic gear set via the or by means of the or by the drive shaft. More specifically, the drive shaft can be connected to the first power output via a or by means of a or by a second transmission stage, in particular a second spur gear stage or a second gearwheel pair or a second planetary set, or a second transmission. In addition, the drive shaft can be connected to the epicyclic gear set via a or by means of a or by a third transmission stage, in particular a third spur gear stage or a third gearwheel pair or a third planetary set, or a third transmission. On the driven side, the epicyclic gear set can be connected, in particular directly, to the rotational speed compensating device, in particular the drive side of the rotational speed compensating device. The epicyclic gear set can be connected to the rotational speed compensating device, in particular the drive side of the rotational speed compensating device, via a or by means of a or by a fourth transmission stage, in particular a fourth spur gear stage or a fourth gearwheel pair or a fourth planetary set, or a fourth transmission.

As a modification of the disclosure, the rotational speed compensating device, in particular the differential, is connected on the driven side to a first and second final driven shaft for driving ground-engaging means. The rotational speed compensating device can be connected on the drive side to the drive shaft.

As a modification of the disclosure, the drive shaft is designed as a hollow shaft. The hollow shaft can surround one or more final driven outputs or one or more final driven shafts. More specifically, the hollow shaft can at least partially or completely surround at least one of the first and second final driven shafts. One or more final driven outputs or one or more of the final driven shafts can be arranged partially or completely in the hollow shaft. It is thereby possible to achieve a compact design configuration of the drive assembly, in particular of the axle.

As a modification of the disclosure, the energy machine has an axis of rotation aligned coaxially with and/or parallel to the drive shaft or hollow shaft. The axis of rotation can also be aligned coaxially with and/or parallel to the drive side of the rotational speed compensating device. It is likewise possible for the energy machine, in particular the axis of rotation, and the epicyclic gear set, in particular an axis of rotation of the epicyclic gear set, to be arranged coaxially with and/or parallel to one another.

As a modification of the disclosure, the energy machine or the epicyclic gear set is connected via an or by means of an or by an angular gear set to the first power output. The angular gear set can be a bevel gear set, for example. The angular gear set can comprise drive and driven shafts at an angle to one another, the axes of which have a common point of intersection. Torque or force transmission can be accomplished by means of bevel gears, for example. The angular gear set can comprise a first and a second bevel gearwheel. The second gearwheel can be connected to the first output shaft. More specifically, the first bevel gearwheel can be designed as a pinion or bevel pinion. The second bevel gearwheel can be designed as a bevel gear or crown gear. The axes of rotation of the first and second bevel gearwheel can, in particular, be arranged at a 90 degree angle to one another. The energy machine can be connected on the driven side, in particular directly, to the angular gear set, and the angular gear set can be connected to the first power output. The energy machine can be connected via the or by means of the or by the drive shaft to the angular gear set, in particular the first bevel gearwheel, and the angular gear set, in particular the second bevel gearwheel, can be connected to the first power output, in particular the first output shaft. More specifically, the drive shaft can be connected to the angular gear set, in particular the first bevel gearwheel, via a or by means of a or by a second transmission stage, in particular a second spur gear stage or a second gearwheel pair or a second planetary set or a second transmission, and the angular gear set, in particular the second bevel gearwheel, can be connected to the first power output, in particular the first output shaft. It is likewise possible for the epicyclic gear set to be connected on the driven side, in particular directly, to the angular gear set, in particular the first bevel gearwheel, and for the angular gear set, in particular the second bevel gearwheel, to be connected to the first power output, in particular the first output shaft. More specifically, the epicyclic gear set can be connected to the angular gear set, in particular the first bevel gearwheel, via a or by means of a or by a fourth transmission stage, in particular a fourth spur gear stage or a fourth gearwheel pair or a fourth planetary set, or a fourth transmission, and the angular gear set, in particular the second bevel gearwheel, can be connected to the first power output, in particular the first output shaft. In this way, a compact construction of the drive assembly is obtained, and the angular gear set is required only for driving the first power output but not for driving the ground-engaging means.

As a modification of the disclosure, the epicyclic gear set has an internal rotor, an external rotor, in particular an internal stator, and an interposed magnetic modulation ring. The internal rotor can be a wheel, in particular an internal wheel, or a ring, in particular an internal ring. The external rotor, also referred to as an outer rotor, for example the external stator, can be a wheel, in particular an external wheel, or a ring, in particular an external ring. The internal rotor and/or external rotor can comprise permanent magnets, in particular one or more magnet pole pairs. The magnetic pole pair can have two magnets arranged adjacent to one another, e.g. permanent magnets or arc segment magnets. The magnets of the magnetic pole pair can have an alternating polarization, in particular an alternating and radial polarization. The internal rotor and the external rotor can have a different number of permanent magnets or magnetic pole pairs from one another. More specifically, the external rotor can have a larger number of permanent magnets or magnetic pole pairs than the internal rotor. Alternatively, the external rotor can be designed as an external stator having coils. In other words, the external stator may be designed to generate a magnetic field. The external stator can comprise windings for generating the magnetic field. If alternating current is applied to these coils or windings, a rotating electromagnetic field is generated as a result. More specifically, the control unit can be configured to set and/or adjust the external rotor or the external stator in order to set and/or adjust the rotational speed of the first power output and/or of the rotational speed compensating device. The mode of operation is similar to the mode of operation of brushless motors with permanent magnets. The electromagnetic field is functionally equivalent to the external stator with permanent magnets. Here, implementation as an external stator with coils eliminates a rotating part (the external rotor with permanent magnets or outer rotor), simplifying the mounting of the entire epicyclic transmission stage. Arranged between the internal rotor and the external rotor or stator is the magnetic modulation ring, in particular the rotatable magnetic modulation ring. The modulation ring can comprise a wheel or a ring. The modulation ring can comprise permanent magnets. The modulation ring can likewise comprise modulating ferromagnetic segments or one or more segment pairs. The segment pairs can be alternately ferromagnetic and paramagnetic. The modulation ring can modulate the magnetic flux between the external rotor and the internal rotor or the external stator and the internal rotor. More specifically, the epicyclic gear set can comprise the internal rotor with a first number of magnetic pole pairs, the external stator with a second number of electric pole pairs and the modulation ring with a third number of ferromagnetic segments. The modulation ring can modulate the electromagnetic field between the internal rotor and the stator.

As a modification of the disclosure, the internal rotor is designed as a drive side of the epicyclic gear set, i.e. for example as an input of the epicyclic gear set, such as with a drive element, and the modulation ring is designed as a driven side of the epicyclic gear set, for example as an output of the epicyclic gear set, such as with a driven element. The energy machine can be connected on the driven side, in particular directly, to the internal rotor. The energy machine can be connected to the internal rotor via the or by means of the or by the drive shaft. More specifically, the drive shaft can be connected to the internal rotor via a or by means of a or by a third transmission stage, in particular a third spur gear stage or a third gearwheel pair or a third planetary set, or a third transmission. The first power output or the rotational speed compensating device can be connected on the drive side to the modulation ring. The modulation ring can be connected, in particular on the driven side and/or directly, to the first power output, in particular the first output shaft. The modulation ring can be connected to the first power output, in particular the first output shaft, via the or by means of the or by the fourth transmission stage, in particular the fourth spur gear stage or the fourth gearwheel pair or the fourth planetary set, or the fourth transmission. It is likewise possible for the modulation ring to be connected, in particular on the driven side and/or directly, to the angular gear set, in particular the first bevel gearwheel, and for the angular gear set, in particular the second bevel gearwheel, to be connected to the first power output, in particular the first output shaft. More specifically, the modulation ring can be connected to the angular gear set, in particular the first bevel gearwheel, via the or by means of the or by the fourth transmission stage, in particular the fourth spur gear stage or the fourth gearwheel pair or the fourth planetary set, or the fourth transmission, and the angular gear set, in particular the second bevel gearwheel, can be connected to the first power output, in particular the first output shaft. The control unit can be configured to set and/or adjust the external rotor or the external stator in order to set and/or adjust the rotational speed of the first power output. Alternatively, the modulation ring can be connected, in particular on the driven side and/or directly, to the rotational speed compensating device, in particular the drive side of the rotational speed compensating device. The modulation ring can be connected to the rotational speed compensating device, in particular the input side of the rotational speed compensating device, via the or by means of the or by the fourth transmission stage, in particular the fourth spur gear stage or the fourth gearwheel pair or the fourth planetary set, or the fourth transmission. The control unit can be configured to set and/or adjust the external rotor or the external stator in order to set and/or adjust the rotational speed of the first power output and/or of the rotational speed compensating device.

For details of the construction and functioning of the magnetic-electric epicyclic gear set, reference may be made to DE 10 2020 119 984 A1 and M. Lang, Design and Analysis of a Magnetic-Electric Epicyclic Power-Split Transmission Stage for Use in an Agricultural Vehicle, Dissertation, Berlin 2020, which are hereby incorporated by reference.

As a modification of the disclosure, the energy machine and/or the stator are driven electrically by a control unit in such a way that the first power output and the drive shaft rotate at a specifiable rotational speed. In other words, the control unit can be configured to electrically drive the energy machine and/or the stator in such a way that the first power output and the drive shaft rotate at a specifiable rotational speed. The control unit can be configured to set and/or adjust the energy machine and/or the energy store, such that the electric energy or power generated by the energy machine and/or stored in the energy store is discharged to the stator, in particular to the windings thereof. In other words, the energy machine and/or the energy store can be set and/or adjusted by means of the control unit in such a way that the electric energy or power generated by the energy machine and/or stored in the energy store is discharged to the stator, in particular to the windings thereof. Thus, a rotational speed and/or a torque of the energy machine and/or of the epicyclic gear set can be capable of being set and/or adjusted, such that the first power output and the drive shaft rotate at a specifiable rotational speed.

The disclosure furthermore relates to an axle, in particular an electrically driven axle, for a work machine, comprising a drive assembly, in particular a drive assembly as described herein. The drive assembly can be arranged on the axle or integrated into the axle.

The disclosure furthermore relates to a work machine, comprising an axle, in particular an axle as described herein, or a drive assembly, in particular a drive assembly as described herein. The work machine can be a construction machine or a towing vehicle, for example an agricultural towing vehicle, e.g. a tractor. The work machine has the above-described advantages of the drive assembly.

The work machine comprises the drive assembly. The drive assembly is designed for driving the work machine. The work machine can comprise one, two or more axle(s). More specifically, the work machine can comprise a first and a second vehicle axle. The axle(s), in particular the first and/or second vehicle axle, can comprise the drive assembly. More specifically, the drive assembly can be integrated into the axle, in particular into the first and/or second vehicle axle. The work machine can be drivable with a rotational speed and/or force and/or a torque of the energy machine. In this instance, the first vehicle axle can be a front axle, in particular a steerable front axle, and/or the second vehicle axle can be a rear axle.

The control unit can be configured for controlling, by open-loop and/or closed-loop control, in particular setting and/or adjusting, the work machine, in particular the energy machine. The work machine can comprise an input and output unit. The control unit can be connected to the input and output unit for signaling and/or operatively coupled and/or connected thereto for transmitting signals and/or carrying data, and/or can be controllable and/or settable and/or adjustable by means of the input and output unit. The input and output unit can be integrated into the control unit or vice versa. The operator of the work machine can use the input and output unit to set and/or adjust a speed of the work machine, for example.

The work machine can also comprise one or more auxiliary units, such as a pump and/or a radiator, etc. The auxiliary units can be part of the hydraulic system of the drive assembly. The work machine can comprise the first power output, in particular the PTO unit. The control unit can be configured to set and/or adjust and/or control the drive assembly and/or the axle and/or work machine by means of a driving signal and to set and/or adjust, in particular to increase or reduce, a speed of the work machine by means of and/or based on the driving signal. The work machine can comprise the ground-engaging means. The ground-engaging means can support and/or carry the work machine on the ground. A towing-vehicle frame of the work machine can be supported on the ground-engaging means. The ground-engaging means can be wheels or tracks or chains. In particular, the ground-engaging means can be front wheels and rear wheels. The work machine can comprise a speed sensor, e.g. a rotational speed sensor, for detecting a speed of the work machine. More specifically, the control unit can be configured to set and/or adjust and/or control a force and/or a torque and/or a rotational speed of the energy machine.

The drive assembly or the axle or the work machine can comprise the set of power electronics. The set of power electronics and/or the energy store can be integrated into the control unit or be controllable as external unit(s) by the control unit. The set of power electronics can comprise an electronic control device and/or an inverter and/or a voltage transformer. During operation, the inverter can transform the voltage of the energy store into a voltage or energy or power that is required by the energy machine and/or the stator. This operation can be reversed for the purposes of charging the energy store. The control unit can comprise a computing unit, a computer, a processor, a memory and/or all the software, hardware, algorithms, connections, in particular also sensors, that are required for setting and/or adjusting the energy machine and/or the external rotor or stator of the epicyclic transmission stage and thus also for setting and/or adjusting the modulation ring. The energy store can be controllable by suitable control electronics in order to store electric energy and/or power and discharge it to the stator. The control unit and/or the energy machine and/or the epicyclic transmission stage, in particular the external stator, can be electrically connected and/or electrically couplable to the set of power electronics and/or the energy store.

The energy machine and/or the set of power electronics and/or the energy store and/or the first power output, in particular the PTO unit, can be operable, for example controllable by open-loop and/or closed-loop control, such as drivable and/or settable and/or adjustable by means of the control unit. The control unit can transmit and/or receive signals for controlling the operation of the drive assembly and/or the axle and/or the work machine. The signals can be expediently provided via a suitable data communication network, for example one that conforms to the ISOBUS standard or CAN standard. The control unit can be configured as an electronic module, an embedded system, a computing unit, a computer, as a module for controlling and/or feedback-controlling the drive assembly and/or the axle and/or the work machine. The control unit can comprise one or more processors and memories and/or all of the software, hardware, algorithms, connections, and in particular also sensors, that are required for the open-loop and/or closed-loop control of the drive assembly and/or of the axle and/or of the work machine. Methods can be configured as a program or algorithm that can be executed on and/or by the control unit. The control unit can include any device which analyses data from various sensors, compares data and makes the necessary decisions in order to exercise open-loop and/or closed-loop control over and/or to carry out the operation of the drive assembly and/or of the axle and/or of the work machine, and in order to exercise open-loop and/or closed-loop control over and/or to carry out the tasks required for open-loop and/or closed-loop control of the operation of the drive assembly and/or of the axle and/or of the work machine. The control unit can be connected for signaling and/or operatively coupled and/or connected for transmitting signals and/or carrying data to the components of the drive assembly and/or the axle and/or the work machine, that is to say, in particular, the energy machine and/or the set of power electronics and/or the energy store and/or the sensors, e.g. one or more speed sensors and/or rotational speed and/or torque sensors. Connected for signaling and/or operatively coupled and/or a connection for transmitting signals and/or carrying data can be understood as meaning, inter alia, that signals and/or data can be exchanged between the connected parts and the control unit. Signals can for example be received and transmitted, and/or processed and/or manipulated, by the control unit. The connection between the control unit and the parts or components of the drive assembly and/or of the axle and/or of the work machine can be wired, i.e. in particular by cable, and/or wireless, i.e. by radio, for example using Bluetooth or WLAN. Communication can be for example by means of Isobus, CAN bus, or the like. The control unit can be connected directly to the input and output unit, which is arranged on or in the work machine and by means of which data entered by an operator can be transmitted to the control unit or received from the control unit and output. The control unit can be integrated into the input and output unit or vice versa.

FIG. 1 shows a schematic illustration of a first example embodiment of a work machine 10, in particular an agricultural towing vehicle which is in the form of a farm tractor. The work machine 10, which is movable in a forward direction V, e.g. over a field, comprises a supporting frame 16, which is supported on the ground by two axles. The two axles are designed as a first vehicle axle 12, in this case a steerable front axle, with ground-engaging means 24, and a second vehicle axle 14, in this case a drivable rear axle with ground-engaging means 26. The work machine 10 comprises a drive assembly 22. In the embodiment illustrated, the work machine 10 is driven in a purely electrical manner. For this purpose, the work machine 10, in particular the drive assembly 22, can comprise an energy store 18, in this case, for example, a battery (rechargeable battery), which is electrically connected to an energy machine 40 (see FIGS. 2 to 8) of the drive assembly 22. The drive assembly 22 is designed for mechanically driving the axles 100, in this case the second vehicle axle 14, in particular for driving a rotational speed compensating device 44 (see FIGS. 2 to 7) and/or a first power output 32. The first power output 32 can be designed as a PTO unit. The first power output 32 can be provided for the purpose of driving an implement (not shown), which can be attached to the work machine 10 via an interface 34 (e.g. three-point interface). More specifically, the axle 100, in the present case the second vehicle axle 14, can comprise the drive assembly 22, or the drive assembly 22 can be arranged thereon. However, each axle 100, in particular the first and/or second vehicle axle 12, 14, can also comprise a respective drive assembly 22. The work machine 10, in particular however, as an alternative, also the axle 100 or the drive assembly 22, can comprise a control unit 80 and/or an input and output unit 90. The control unit 80 is connected to the energy machine 40 for signaling, and/or is operatively coupled and/or connected thereto for transmitting signals and/or carrying data. The control unit 80 is configured to set and/or adjust the rotational speed and/or the torque of the drive assembly 22, in particular of the energy machine 40 and/or of the epicyclic gear set 42. The control unit 80 can be configured to set and/or adjust a specifiable rotational speed and/or a specifiable torque of the drive assembly 22, in particular of the energy machine 40 and/or of the epicyclic gear set 42. However, the control unit 80 can also be connected to the energy store 18 and/or to a set of power electronics 92 of the drive assembly 22, in particular, as an alternative, the axle 100 or the work machine 10 and/or sensors of the drive assembly, in particular, as an alternative, of the axle or of the work machine, for signaling, and/or operatively coupled and/or connected thereto for transmitting signals and/or carrying data. The control unit 80 can be configured to set and/or adjust the epicyclic gear set 42, in particular an external rotor or the external stator 62, in order to set and/or adjust the rotational speed of the first power output 32 and/or of the rotational speed compensating device.

The energy store 18 supplies the electrically driven elements of the drive assembly 22, in particular the energy machine 40, with currents or voltages of suitable frequency and amplitudes in order to provide desired output speeds or torques for the first power output 32 and/or the rotational speed compensating device 44 (see FIGS. 2 to 8) and thus the second vehicle axle 14.

Figure 2:
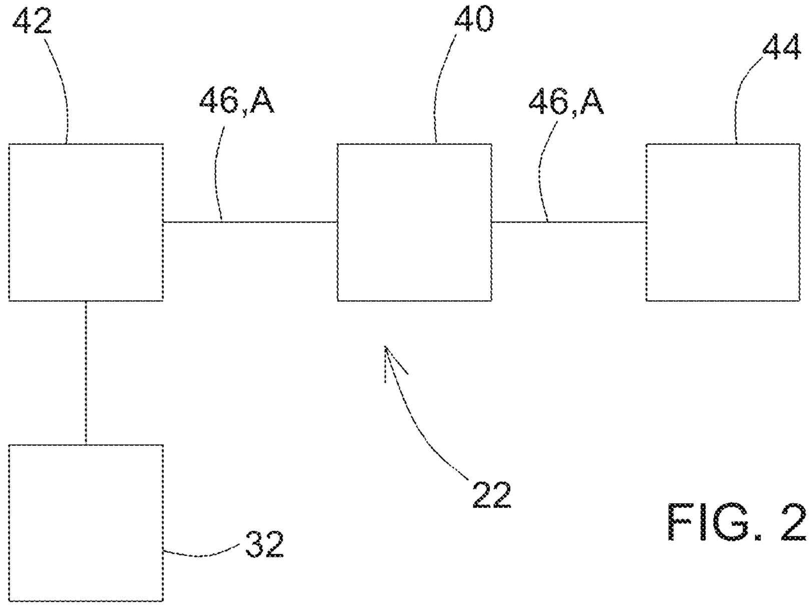
FIG. 2 shows a schematic illustration of the first example embodiment of the drive assembly according to the disclosure.

FIG. 2 shows a schematic illustration of the first example embodiment of the drive assembly 22 according to the disclosure. The drive assembly 22 shown in FIG. 2 corresponds substantially to the drive assembly 22 shown in FIG. 1, and therefore only details and/or points of differentiation will be discussed below. The work machine 10 illustrated in FIG. 1 can comprise the drive assembly 22 illustrated in FIG. 2.

The drive assembly 22 comprises the energy machine 40, a rotational speed compensating device 44, the first power output 32 and a magnetic-electric epicyclic gear set 42. Via one or by means of one or by one drive shaft 46, the epicyclic gear set 42 is connected, that is to say, in particular, is connected in a torque- and/or speed-transmitting manner, to the energy machine 40, and mechanically and rigidly coupled thereto.

The epicyclic gear set 42 is arranged for the purpose of setting and/or adjusting the rotational speed of the first power output 32 and/or of the rotational speed compensating device 44, in the present case only of the first power output 32. The epicyclic gear set 42 is inserted into the power flow between the energy machine 40 and the first power output 32. In other words, the control unit can be configured to set and/or adjust the epicyclic gear set 42, in particular the external rotor or the external stator, in order to set and/or adjust the rotational speed of the first power output 32.

The energy machine 40 can drive the drive assembly 22 with a force and/or a rotational speed and/or a torque. The energy machine 40 is connected on the driven side to the drive shaft 46. The energy machine 40 is connected directly to the rotational speed compensating device, in particular by means of the drive shaft 46. The energy machine 40 is connected indirectly to the first power output 32 via the epicyclic gear set 42. More specifically, the energy machine 40 drives the drive shaft 46 and thus the rotational speed compensating device 44 and the epicyclic gear set 42. The energy machine 40 can be operable as a motor or a generator. The energy machine 40 can therefore be designed as a generator and can charge the energy store, in particular in a regeneration mode. The energy machine 40 has an axis of rotation A aligned coaxially with and/or parallel to the drive shaft 46.

On the drive side, the rotational speed compensating device 44 is connected, that is to say, in particular, is connected in a torque- and/or speed-transmitting manner, to the drive shaft 46 and the energy machine 40, and mechanically and rigidly coupled thereto. The rotational speed compensating device 44 can be driven by the energy machine by means of or via the drive shaft 46. On the driven side, the rotational speed compensating device 44 can be designed to drive the ground-engaging means 24, 26. The rotational speed compensating device 44 can be a differential, in particular a bevel gear set differential or planetary differential.

A point for the disclosure is that the epicyclic gear set 42 is arranged for setting and/or adjusting the rotational speed at the drive shaft 46 and/or the rotational speed compensating device 44 and/or the first power output 32. Alternatively, or in addition, it is therefore possible to use the epicyclic gear set 42 to set and/or adjust a rotational speed at the drive shaft 46 and/or the rotational speed compensating device 44 and/or the first power output 32. It is thereby possible to achieve a construction of the drive assembly 22 that is simple in design and/or compact.

Figure 3:
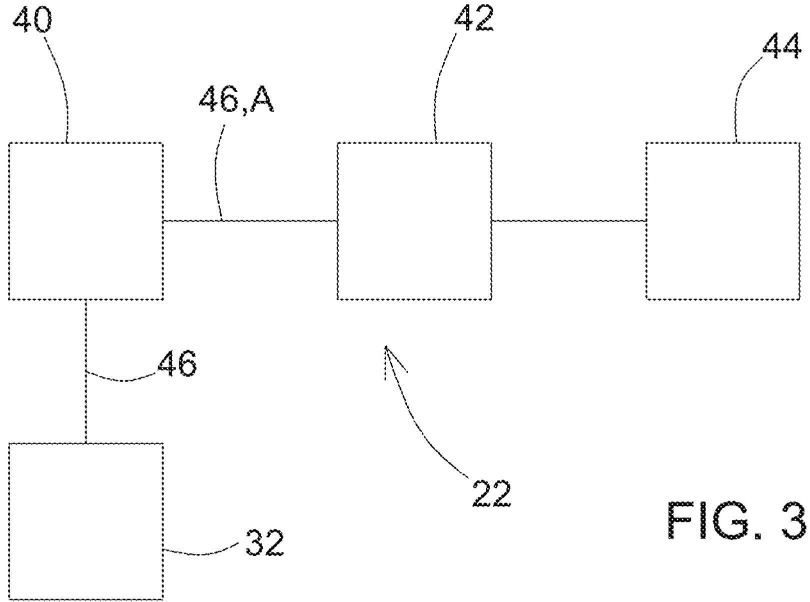
FIG. 3 shows a schematic illustration of a second example embodiment of the drive assembly according to the disclosure.

FIG. 3 shows a schematic illustration of the second example embodiment of the drive assembly 22 according to the disclosure. The drive assembly 22 shown in FIG. 3 corresponds substantially to the drive assembly 22 shown in FIGS. 1 and 2, and therefore only details and/or points of differentiation will be discussed below. The work machine 10 illustrated in FIG. 1 can comprise the drive assembly 22 illustrated in FIG. 3.

The epicyclic gear set 42 is inserted into the power flow between the energy machine 40 and the rotational speed compensating device 44. In other words, the control unit can be configured to set and/or adjust the epicyclic gear set 42, in particular the external rotor or the external stator, in order to set and/or adjust the rotational speed of the rotational speed compensating device 44.

The energy machine 40 is connected directly to the first power output 32, in particular by means of or via the drive shaft 46. The energy machine 40 is connected indirectly to the rotational speed compensating device 44 via the epicyclic gear set 42. More specifically, the energy machine 40 drives the drive shaft 46 and thus the first power output 32 and the epicyclic gear set 42.

On the drive side, the first power output 32 is connected, that is to say, in particular, is connected in a torque- and/or speed-transmitting manner, to the drive shaft 46 and the energy machine 40, and mechanically and rigidly coupled thereto. The first power output 32 can be driven by the energy machine by means of or via the drive shaft 46. The rotational speed compensating device 44 is connected on the drive side to the epicyclic gear set 42.

Figure 4:
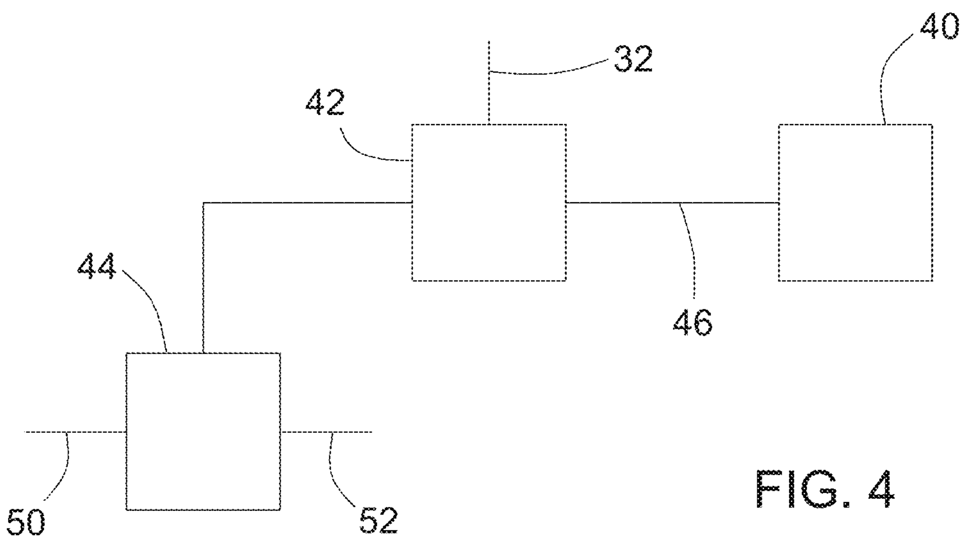
FIG. 4 shows a schematic illustration of a third example embodiment of the drive assembly according to the disclosure.

FIG. 4 shows a schematic illustration of the third example embodiment of the drive assembly 22 according to the disclosure. The drive assembly 22 shown in FIG. 4 corresponds substantially to the drive assembly 22 shown in FIGS. 1 to 3, and therefore only details and/or points of differentiation will be discussed below. The work machine 10 illustrated in FIG. 1 can comprise the drive assembly 22 illustrated in FIG. 4.

The epicyclic gear set 42 is inserted into the power flow between the energy machine 40 and the rotational speed compensating device 44 and the first power output 32. In other words, the control unit can be configured to set and/or adjust the epicyclic gear set 42, in particular the external rotor or the external stator, in order to set and/or adjust the rotational speed of the rotational speed compensating device 44 and of the first power output 32.

The energy machine 40 is connected directly to the epicyclic gear set 42, in particular by means of or via the drive shaft 46. The energy machine 40 is connected indirectly to the rotational speed compensating device 44 and the first power output 32 via the epicyclic gear set 42. On the drive side, the epicyclic gear set 42 is connected, that is to say, in particular, is connected in a torque- and/or speed-transmitting manner, to the drive shaft 46 and the energy machine 40, and mechanically and rigidly coupled thereto. On the driven side, the epicyclic gear set 42 is connected, that is to say, in particular, is connected in a torque- and/or speed-transmitting manner, to the rotational speed compensating device 44 and the first power output 32, and mechanically and rigidly coupled thereto.

The rotational speed compensating device 44 is connected on the driven side to a first and second final driven shaft 50, 52 for driving ground-engaging means 24, 26. The rotational speed compensating device 44 shown in FIGS. 1 to 3 can also be connected on the driven side to a first and second final driven shaft 50, 52.

Figure 5:
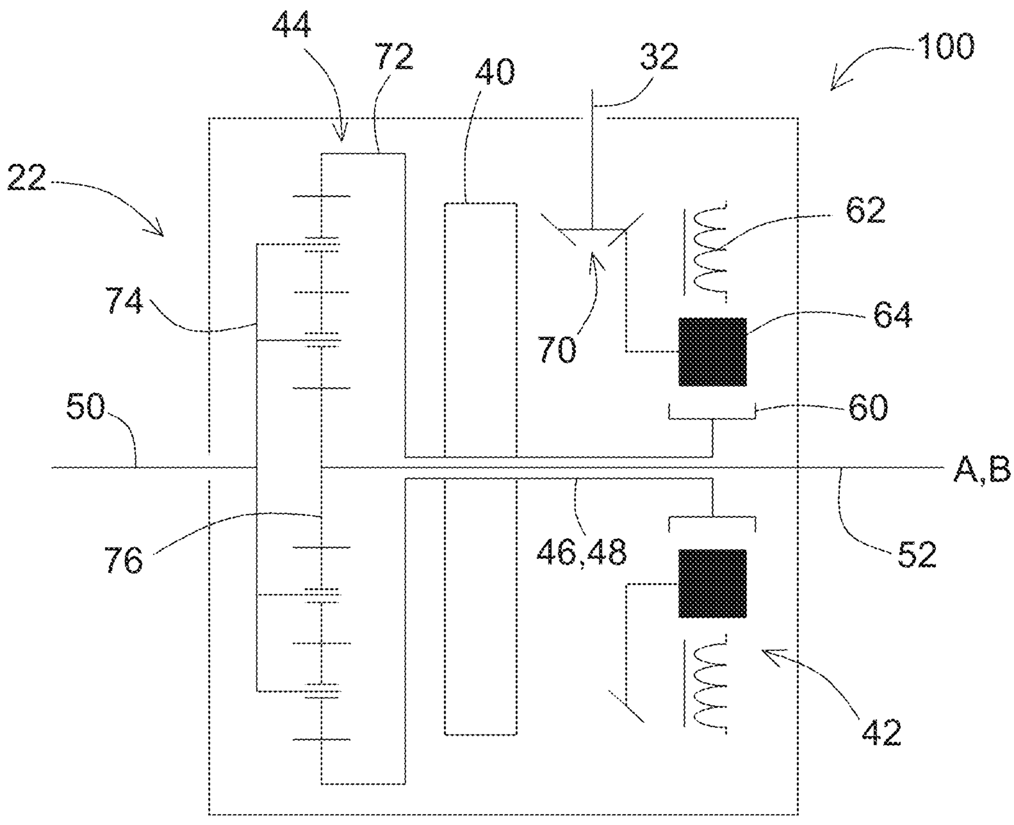
FIG. 5 shows a schematic illustration of a fourth example embodiment of the drive assembly according to the disclosure.

FIG. 5 shows a schematic illustration of the fourth example embodiment of the drive assembly 22 according to the disclosure, which can, in particular, be integrated into an axle 100. The drive assembly 22 shown in FIG. 5 corresponds substantially to the drive assembly 22 shown in FIGS. 1 to 4, and therefore only details and/or points of differentiation will be discussed below. The work machine 10 illustrated in FIG. 1 can comprise the drive assembly 22 illustrated in FIG. 5.

The epicyclic gear set has an internal rotor 60, an external rotor 62 and an interposed magnetic modulation ring 64. The internal rotor 60 of the epicyclic gear set 42 is designed as a drive side, and the modulation ring 64 is designed as a driven side. The energy machine 40 is connected to the internal rotor 60 of the epicyclic gear set 42 by means of or via or by the drive shaft 46. The drive shaft 46 is designed as a hollow shaft 48. The modulation ring 64 is connected via an angular gear set 70 to the first power output 32. The rotational speed compensating device 44 is designed as a planetary differential, in particular a planetary gear set with double planets. Moreover, the rotational speed compensating device 44, in particular the planet wheel 72 or ring gear, is connected on the drive side to the drive shaft 46 and thus to the energy machine 40. On the driven side, the rotational speed compensating device 44 is connected to the final driven shafts 50, 52, in particular the planet carrier 74 of the rotational speed compensating device 44 is connected to the first final driven shaft 50, and the sun 76 is connected to the second final driven shaft 52.

The energy machine 40 and/or the stator 62 are driven electrically by the control unit 80 in such a way that the first power output 32 and/or the drive shaft 46 rotate at a specifiable rotational speed. In other words, the control unit 80 can be configured to electrically drive the energy machine 40 and/or the stator 62 in such a way that the first power output 32 and the drive shaft 46 rotate at a specifiable rotational speed.

The energy machine 40 has an axis of rotation A aligned coaxially with and/or parallel to the drive shaft 46. Moreover, the energy machine 40, in particular the axis of rotation A, and the epicyclic gear set 42, in particular an axis of rotation B of the epicyclic gear set 42, are arranged coaxially with and/or parallel to one another.

Figures 6, 7:
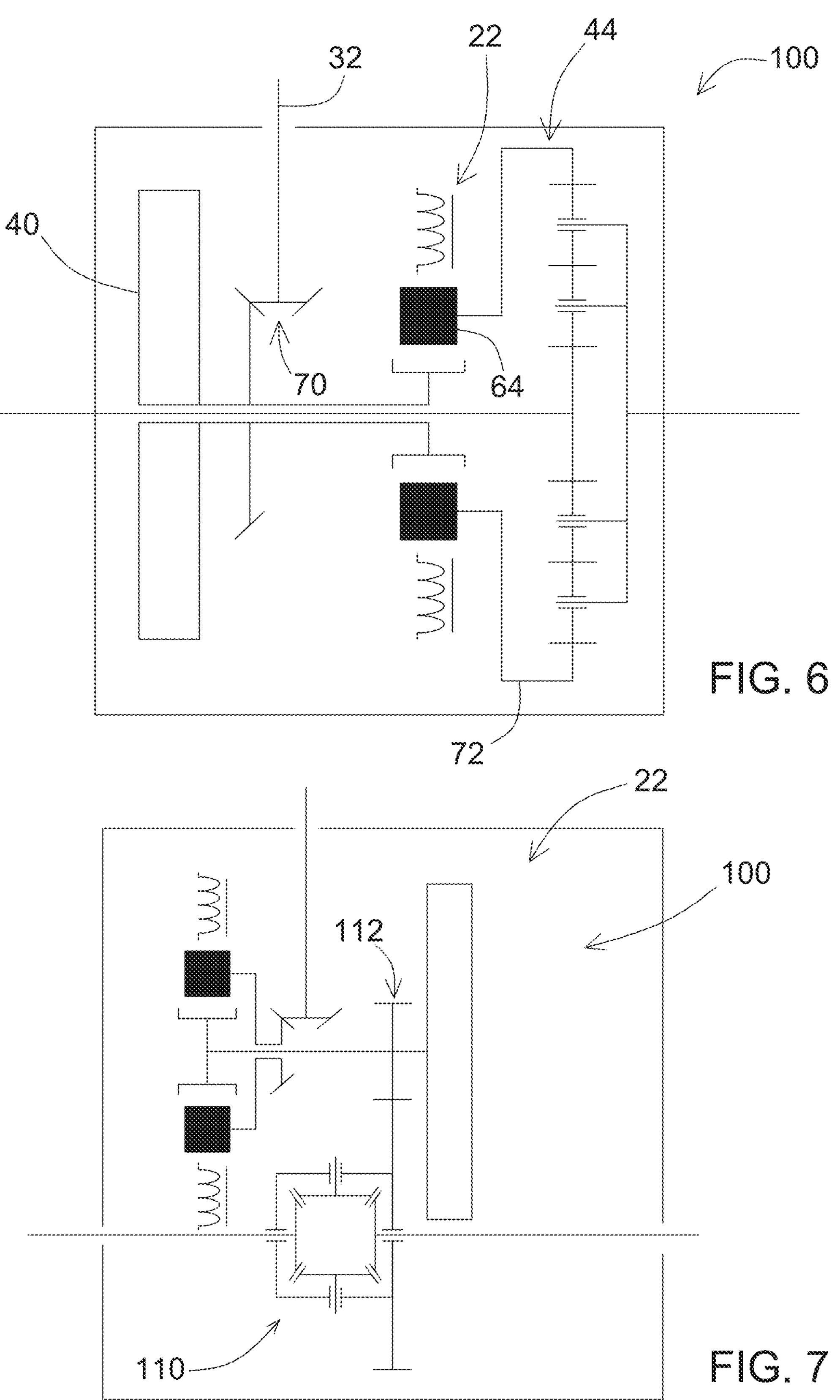
FIG. 6 shows a schematic illustration of a fifth example embodiment of the drive assembly according to the disclosure.
FIG. 7 shows a schematic illustration of a sixth example embodiment of the drive assembly according to the disclosure.

FIG. 6 shows a schematic illustration of the fifth example embodiment of the drive assembly 22 according to the disclosure, which can, in particular, be integrated into an axle 100. The drive assembly 22 shown in FIG. 6 corresponds substantially to the drive assembly 22 shown in FIGS. 1 to 5, and therefore only details and/or points of differentiation will be discussed below. The work machine 10 illustrated in FIG. 1 can comprise the drive assembly 22 illustrated in FIG. 6.

The energy machine 40 is connected to the internal rotor 60 of the epicyclic gear set 42 by means of or via or by the drive shaft 46. Moreover, the energy machine 40 is connected to the angular gear set 70 via the drive shaft 46, and the angular gear set 70 is connected to the first power output 32. The rotational speed compensating device 44 is again designed as a planetary differential. The rotational speed compensating device 44, in particular the planet wheel 72 or ring gear, is connected on the drive side to the modulation ring 64 of the epicyclic gear set 42. The energy machine 40 is connected indirectly to the rotational speed compensating device 44 via the epicyclic gear set 42.

Figure 8:
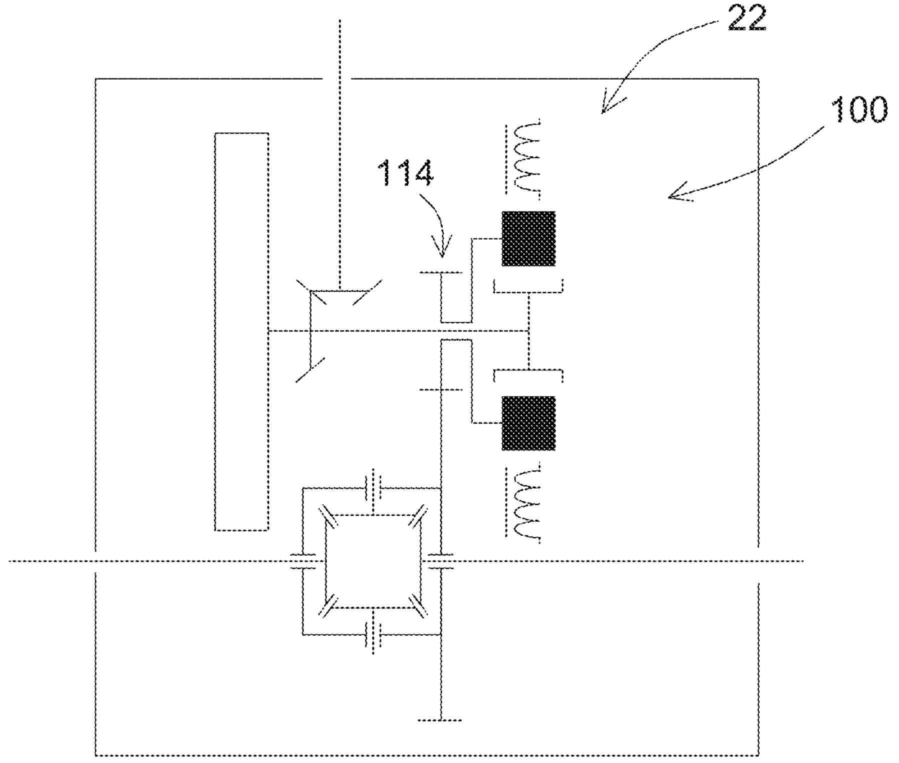
FIG. 8 shows a schematic illustration of a sixth example embodiment of the drive assembly according to the disclosure.

FIGS. 7 and 8 show schematic illustrations of the sixth and seventh example embodiment of the drive assembly 22 according to the disclosure, which can, in particular, be integrated into an axle 100. The drive assemblies 22 shown in FIGS. 7 and 8 correspond substantially to the drive assembly 22 shown in FIGS. 1 to 6, and therefore only details and/or points of differentiation will be discussed below. The work machine 10 illustrated in FIG. 1 can comprise the drive assemblies 22 illustrated in FIGS. 7 and 8.

In FIGS. 7 and 8, the rotational speed compensating devices 44 are designed as a bevel gear set 110. Like the angular gear set 70, the bevel gear set 110 can comprise drive and driven shafts that are at an angle to one another and the axes of which have a common point of intersection. Torque or force transmission can be accomplished by means of bevel gears, for example. The bevel gear set 110 can comprise one or more bevel gearwheels. In FIG. 7, the bevel gear set 110 is connected on the driven side to the first and second final driven shafts 50, 52. On the drive side, the bevel gear set 110 is connected to the drive shaft 46 by means of a second or via a second transmission stage 112. The drive shaft 46 is designed as a solid shaft. The epicyclic gear set has an internal rotor 60, an external rotor 62 and an interposed magnetic modulation ring 64. The internal rotor 60 of the epicyclic gear set 42 is designed as a drive side, and the modulation ring 64 is designed as a driven side. The energy machine 40 is connected to the internal rotor 60 of the epicyclic gear set 42 by means of or via or by the drive shaft 46. The drive shaft 46 is designed as a hollow shaft 48. The modulation ring 64 is connected via an angular gear set 70 to the first power output 32. The rotational speed compensating device 44 is designed as a planetary gear set with double planets (different embodiment?). Moreover, the rotational speed compensating device 44, in particular the planet wheel 72 or ring gear, is connected on the drive side to the drive shaft 46 and thus to the energy machine 40. On the driven side, the rotational speed compensating device 44 is connected to the final driven shafts 50, 52, in particular the planet carrier 74 of the rotational speed compensating device 44 is connected to the first final driven shaft 50, and the sun 76 is connected to the second final driven shaft 52.

The energy machine 40 and/or the stator 62 are driven electrically by the control unit 80 in such a way that the first power output 32 and/or the drive shaft 46 rotate at a specifiable rotational speed. In other words, the control unit 80 can be configured to electrically drive the energy machine 40 and/or the stator 62 in such a way that the first power output 32 and the drive shaft 46 rotate at a specifiable rotational speed.

The energy machine 40 has an axis of rotation A aligned coaxially with and/or parallel to the drive shaft 46. Moreover, the energy machine 40, in particular the axis of rotation A, and the epicyclic gear set 42, in particular an axis of rotation B of the epicyclic gear set 42, are arranged coaxially with and/or parallel to one another.

In FIG. 8, the bevel gear set 110 is connected on the drive side to the modulation ring 64 by means of a fourth or via a fourth transmission stage 114.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A drive assembly for a work machine, comprising:

an energy machine;

a first final driven shaft and a second final driven shaft for driving ground-engaging means;

a planetary gear set including a sun gear, a ring gear, and a planet carrier having double planets, the planet carrier connected directly to the first final driven shaft, and the sun gear connected directly to the second final driven shaft;

a first power output including a PTO unit having a PTO gear and a power takeoff shaft; and a magnetic-electric epicyclic gear set including an internal rotor, an external rotor, and a magnetic modulation ring interposed between the internal and external rotors, the internal rotor connected to the energy machine via a hollow drive shaft surrounding at least a portion of the second final driven shaft, and the magnetic-electric epicyclic gear set being arranged to adjust the rotational speed of one or more of the first power output PTO unit or the planetary gear set.

2. The drive assembly of claim 1, wherein the magnetic-electric epicyclic gear set is inserted into the power flow between the energy machine and the PTO unit, the magnetic modulation ring is connected to the power takeoff shaft via the PTO gear, and the energy machine is connected to ring gear via the hollow drive shaft.

3. The drive assembly of claim 1, wherein the magnetic-electric epicyclic gear set is inserted into the power flow between the energy machine and the rotational speed compensating device, the magnetic modulation ring is connected to the ring gear, and the energy machine is connected to the PTO gear via the hollow drive shaft.

4. The drive assembly of claim 1, wherein the energy machine has an axis of rotation aligned coaxially with and parallel to the hollow drive shaft.

5. The drive assembly of claim 1, wherein the PTO gear includes an angular gear set.

6. The drive assembly of claim 1, wherein an axis of rotation the energy machine and an axis of rotation of the magnetic-electric epicyclic gear set are arranged coaxially with and parallel to one another.

7. The drive assembly of claim 1, wherein the external rotor is driven electrically via a control unit such that the PTO unit and the hollow drive shaft rotate at a specifiable rotational speed.

8. An axle for a work machine including a drive assembly, comprising:

an energy machine;

a first final driven shaft and a second final driven shaft for driving ground-engaging means;

a planetary gear set including a sun gear, a ring gear, and a planet carrier having double planets, the planet carrier connected directly to the first final driven shaft, and the sun gear connected directly to the second final driven shaft;

a first power output including a PTO unit having a PTO gear and a power takeoff shaft; and a magnetic-electric epicyclic gear set including an internal rotor, an external rotor, and a magnetic modulation ring interposed between the internal and external rotors, the internal rotor connected to the energy machine via a hollow drive shaft surrounding at least a portion of the second final driven shaft, and the magnetic-electric epicyclic gear set being arranged to adjust the rotational speed of one or more of the PTO unit or the planetary gear set.

9. A work machine including an axle having a drive assembly, comprising:

an energy machine;

a first final driven shaft and a second final driven shaft for driving ground-engaging means;

a rotational speed compensating device planetary gear set including a sun gear, a ring gear, and a planet carrier having double planets, the planet carrier connected directly to the first final driven shaft, and the sun gear connected directly to the second final driven shaft;

a first power output including a PTO unit having a PTO gear and a power takeoff shaft; and a magnetic-electric epicyclic gear set including an internal rotor, an external rotor, and a magnetic modulation ring interposed between the internal and external rotors, the internal rotor connected to the energy machine via a hollow drive shaft surrounding at least a portion of the second final driven shaft, and the magnetic-electric epicyclic gear set being arranged to adjust the rotational speed of one or more of the PTO unit or the planetary gear set.

10. The axle of claim 8, wherein the magnetic-electric epicyclic gear set is inserted into the power flow between the energy machine and the PTO unit, the magnetic modulation ring is connected to the power takeoff shaft via the PTO gear, and the energy machine is connected to ring gear via the hollow drive shaft.

11. The axle of claim 8, wherein the magnetic-electric epicyclic gear set is inserted into the power flow between the energy machine and the rotational speed compensating device, the magnetic modulation ring is connected to the ring gear, and the energy machine is connected to the PTO gear via the hollow drive shaft.

12. The axle of claim 8, wherein the PTO gear includes an angular gear set.

13. The axle of claim 8, wherein the external rotor is driven electrically via a control unit such that the PTO unit and the hollow drive shaft rotate at a specifiable rotational speed.

14. The work vehicle of claim 9, wherein the magnetic-electric epicyclic gear set is inserted into the power flow between the energy machine and the PTO unit, the magnetic modulation ring is connected to the power takeoff shaft via the PTO gear, and the energy machine is connected to ring gear via the hollow drive shaft.

15. The work vehicle of claim 9, wherein the magnetic-electric epicyclic gear set is inserted into the power flow between the energy machine and the rotational speed compensating device, the magnetic modulation ring is connected to the ring gear, and the energy machine is connected to the PTO gear via the hollow drive shaft.

16. The work vehicle of claim 9, wherein the PTO gear includes an angular gear set.

17. The work vehicle of claim 9, wherein the external rotor is driven electrically via a control unit such that the PTO unit and the hollow drive shaft rotate at a specifiable rotational speed.

* * * * *